United States Patent
Sontag et al.

(10) Patent No.: US 9,665,223 B2
(45) Date of Patent: May 30, 2017

(54) CAPACITIVE DONGLE FOR VISUALIZATION DEVICES INCLUDING A CAPACITIVE TOUCH-SENSITIVE SURFACE

(71) Applicant: THALES, Neuilly sur Seine (FR)

(72) Inventors: Yves Sontag, Bordeaux (FR); Philippe Coni, Saint Jean d'Illac (FR); Jean-Christophe Abadie, Biganos (FR)

(73) Assignee: Thales, Neuilly sur Seine (FR)

( * ) Notice: Subject to any disclaimer, the term of this patent is extended or adjusted under 35 U.S.C. 154(b) by 87 days.

(21) Appl. No.: 14/578,294

(22) Filed: Dec. 19, 2014

(65) Prior Publication Data
US 2015/0177883 A1 Jun. 25, 2015

(30) Foreign Application Priority Data
Dec. 20, 2013 (FR) ...................................... 13 03028

(51) Int. Cl.
*G06F 3/044* (2006.01)
*G06F 3/041* (2006.01)
*G06F 3/00* (2006.01)
*G06F 3/039* (2013.01)

(52) U.S. Cl.
CPC .............. *G06F 3/044* (2013.01); *G06F 3/002* (2013.01); *G06F 3/039* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 8,648,837 B1 * | 2/2014 | Tran | G06F 3/0416 178/19.01 |
| 2008/0238879 A1 | 10/2008 | Jaeger et al. | |
| 2010/0044122 A1 * | 2/2010 | Sleeman | G01D 5/2405 178/18.06 |
| 2010/0315384 A1 | 12/2010 | Hargreaves et al. | |

(Continued)

FOREIGN PATENT DOCUMENTS

WO WO 2013/172829 11/2013

OTHER PUBLICATIONS

French Search Report for French Counterpart Application No. FR 1303028, 9 pgs. (Nov. 12, 2014).

*Primary Examiner* — Alexander Eisen
*Assistant Examiner* — Kebede Teshome
(74) *Attorney, Agent, or Firm* — Blakely, Sokoloff, Taylor & Zafman LLP (57) ABSTRACT

The general field of the invention is that of capacitive dongles used with visualization devices including a capacitive touch-sensitive surface comprising a matrix of conductive rows and columns, the dongle being arranged on said touch-sensitive surface in operational use, the dongle operating in send mode and in receive mode, The dongle according to the invention includes:
  means for sending periodic analogue signals sent at a specific frequency known as the dangle frequency;
  a ring-shaped flat conductive metal part connected to said sending means, said part intended to be placed on said touch-sensitive surface;
  means for receiving the received signals output by said conductive metal part;
  means for analyzing said digitized received signals;
  means for storing the sent and analyzed signals;
  a digital communication interface.

11 Claims, 3 Drawing Sheets

(56) References Cited

U.S. PATENT DOCUMENTS

| | | | |
|---|---|---|---|
| 2012/0105362 A1* | 5/2012 | Kremin | G06F 3/03545 |
| | | | 345/174 |
| 2013/0207938 A1* | 8/2013 | Ryshtun | G06F 3/0416 |
| | | | 345/179 |
| 2013/0225072 A1 | 8/2013 | Fuller et al. | |
| 2014/0028607 A1* | 1/2014 | Tan | G06F 3/044 |
| | | | 345/174 |

\* cited by examiner

CAPACITIVE DONGLE FOR VISUALIZATION DEVICES INCLUDING A CAPACITIVE TOUCH-SENSITIVE SURFACE

BACKGROUND OF THE INVENTION

1. Field of the Invention

The field of the invention is that of visualization devices including a capacitive touch-sensitive surface. More precisely, the technical field of the invention is that of devices enabling the exchange of information with this type of visualization device. In the remainder of the text, these means will be referred to as dongles.

2. Description of the Prior Art

Conventionally, to exchange information with a visualization device, two main possible techniques exist. The first is to arrange an electrical connection on the device to which the exchange peripheral or dongle is then connected. The most common example is the USB (Universal Serial Bus) key. The second technique is to use a wireless electrical connection. The best-known is the WiFi (Wireless Fidelity) connection.

Applications do however exist in which visualization devices are perfectly juxtaposed, without any loss of useful surface. These notably include aircraft instrument panels where the whole surface is now dedicated to visualization screens. In this case, it is not easy to arrange the electrical connection technology simply. It is still possible to add connectors on the back face of the visualization devices connected to other connectors arranged under or beside the visualization devices, but these arrangements necessarily complicate the layout of the visualizations and the instrument panel. The use of wireless connections also requires the addition of hardware resources, and these connections can moreover be subject to radio interference, poorly compatible with aeronautics use.

SUMMARY OF THE INVENTION

In many applications visualization devices possess a touch-sensitive surface. One technique used is so-called "projected" capacitive detection. This technique consists in producing a detection matrix composed of conductive rows and columns arranged so as to detect the local variations in capacitance which are introduced by the proximity of the fingers of the user or of any other pointing object on condition that it is electrically conductive. The subject of the invention is the use of the means for detecting variations in capacitance to communicate with the visualization device. Indeed, by its very nature, any signal provoking a known variation in capacitance can be identified by the touch-sensitive surface on condition that the surface possesses the software program required for its recognition. Thus, the dongle according to the invention can communicate with a visualization device including a capacitive touch-sensitive surface simply be placing the device on this touch-sensitive surface without making any further hardware modifications. More precisely, the subject of the invention is a capacitive dongle intended to be used with a visualization device including a capacitive touch-sensitive surface comprising a matrix of conductive rows and columns, the dongle being arranged on said capacitive touch-sensitive surface in operational use, the dongle operating in send mode and in receive mode, characterized in that it includes at least:

- means for sending periodic analogue signals, said signals being sent at at least one specific frequency known as the dongle frequency;
- a ring-shaped flat conductive metal part connected to said sending means, said part intended to be placed on said capacitive touch-sensitive surface;
- means for receiving the received signals output by said conductive metal part;
- means for analyzing said digitized received signals;
- means for storing the sent signals and the analyzed signals;
- a digital communication interface.

Advantageously, the receiving means include:

- means, known as "envelope detection", for detecting signals sent by the touch-sensitive surface within a range of determined amplitudes and frequencies so as to detect the presence of said capacitive touch-sensitive surface, said means operating in passive mode, i.e. without transmission of signals by the sending means;
- synchronous demodulating means operating at the dongle frequency or frequencies so as to communicate in receiving mode with said touch-sensitive surface.

Advantageously, the thickness of the ring is substantially equal to one pitch of the matrix of the capacitive touch-sensitive surface.

Advantageously, the dongle includes a suction cup device making it possible to hold the dongle in place on the capacitive touch-sensitive surface.

The invention also relates to a visualization device including a capacitive touch-sensitive surface capable of exchanging data with a capacitive dongle as defined above and such that the touch-sensitive surface includes:

- a matrix of conductive rows and columns;
- means for recognizing a determined profile corresponding to the variations in capacitance induced on the rows and columns of the matrix by the ring-shaped flat conductive metal part, when the dongle is placed on said touch-sensitive surface;
- means for sending and receiving at the specific dongle frequency.

Advantageously, the screen of the visualization device includes a specific place marked by a particular symbol reserved for the site of the dongle.

Finally, the invention relates to a method of communication between a capacitive dongle and a visualization device as defined above, characterized in that, when the dongle is placed on the capacitive touch-sensitive surface, said method includes the following steps:

Step 1: Recognition, by the recognizing means of the touch-sensitive surface, of the determined profile of the ring-shaped flat conductive metal part of the dongle;

Step 2: Recognition by the detecting means, known as "envelope detection", of the dongle, of the signals sent by the touch-sensitive surface in operation;

Step 3: Preparation of the dongle operating mode of the touch-sensitive surface, the sending means switch to the mode for sending the dongle frequencies and the receiving means of the touch-sensitive surface switch to the mode for receiving the dongle frequencies;

Step 4: Operation in dongle mode, the touch-sensitive surface and the dongle exchange signals at the dongle frequencies.

Advantageously, step 4 is performed in half duplex mode, the dongle and the touch-sensitive surface alternately sending and receiving on the same specific dongle frequencies.

Advantageously, step 4 is performed in full duplex mode, the dongle and the touch-sensitive surface simultaneously sending and receiving on different specific dongle frequencies.

Advantageously, during step 4, the sending and receiving means of the touch-sensitive surface scan only the conductive rows and columns of the matrix arranged under the ring-shaped flat conductive metal part of the dongle.

BRIEF DESCRIPTION OF THE DRAWINGS

The invention will be better understood and other advantages will become apparent on reading the following non-limiting description, with reference to the appended figures among which.

DETAILED DESCRIPTION

Figure 1:
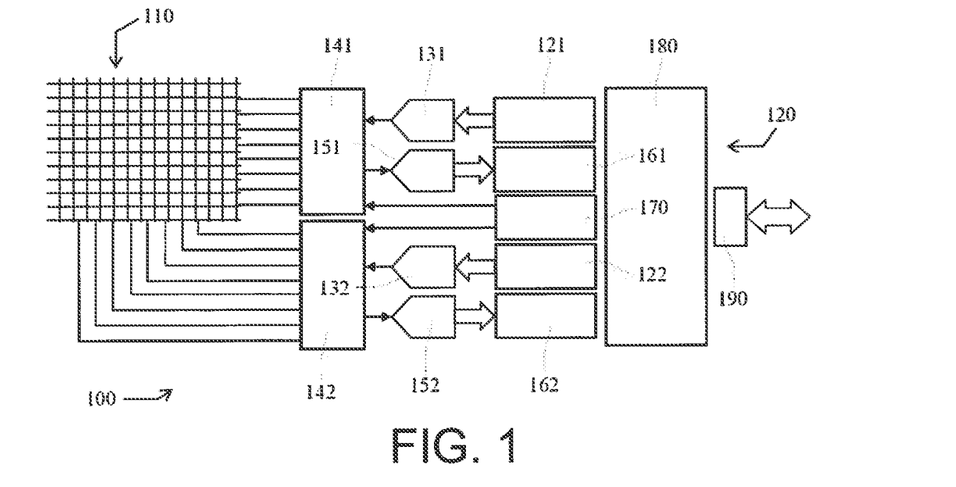
FIG. 1 represents the general block diagram of a touch-sensitive matrix tablet.

The dongle according to the invention is intended to be used with capacitive touch-sensitive tablets. By way of example, FIG. 1 represents the general block diagram of a touch-sensitive matrix tablet 100 and its associated electronics. The matrix 110 is composed of conductive rows and columns usually made of ITO (Indium Tin Oxide). Typically, such a touch-sensitive surface can have fifty or so columns and thirty or so rows for one avionics instrument panel screen. By way of example, the pitch between two rows is in the order of about 7 millimetres.

The electronic part 120 essentially includes:
means 121 and 122 for sending periodic signals intended to supply power to the rows and columns;
DACs (Digital-to-Analogue Converters) 131 and 132, arranged at the output of the sending means;
multiplexing means 141 and 142 arranged at the output of the DACs addressing in succession the various rows and the various columns of the matrix;
ADCs (Analogue-to-Digital Converters) 151 and 152, arranged at the output of the multiplexing means;
synchronous demodulators 161 and 162 arranged at the output of the ADCs;
electronics for addressing the rows and columns 170;
means 160 for digital processing of the signals output from the synchronous demodulators making it possible to determine the variations in capacitance induced in the rows and columns of the matrix. Each demodulator makes it possible to deliver the amplitude and the phase of the processed signal;
an input-output interface 190.

The production of the electronic part can be achieved in various forms. It can comprise conventional components or ASIC (Application-Specific Integrated Circuit) components, analogue or mixed for the so-called "front end" analogue part which performs the voltage injection, current measurement, multiplexing and analogue-to-digital conversion functions. It can comprise a component of FPGA (Field-Programmable Gate Array) type for digital processing or else a microcontroller, integrated into the FPGA or otherwise.

The higher the number of ADCs, the higher the tap detection speed and the shorter the latency time. The block diagram represented in FIG. 1 includes an ADC 131 and a DAC 151 dedicated to the rows and an ADC 132 and a DAC 152 dedicated to the columns.

By way of example, it is possible to use two different frequencies for the row tap detection and two other different frequencies for the column tap detection. In order for the different frequencies not to interfere with each other, they are chosen to be "orthogonal", which means that the integration time is identical for the different synchronous demodulators, this integration time being an exact multiple of each of the periods. This arrangement makes it possible to simultaneously scan the rows and columns without there being any interference between the signals.

The tap detection can be achieved in "self-capacitance" mode and/or in "mutual capacitance" mode. The first mode consists in reading the rows and columns of the key array of the matrix. The second mode consists in reading each intersection of the array of rows and columns of the matrix. The first mode makes it possible to rapidly search the touch-sensitive surface and to locate the possible coordinates of the taps. The second mode makes it possible to tell the real taps from the "ghost" taps.

The touch-sensitive surface according to the invention also includes:
means for recognizing a determined profile corresponding to the variations in capacitance induced on the rows and columns of the matrix by the ring-shaped flat conductive metal part, when the dongle is placed on said touch-sensitive surface;
means for sending and receiving at a specific dongle frequency or frequencies.

The capacitive dongle according to the invention is intended to be used with a visualization device including a capacitive touch-sensitive surface as described above. The function of the dongle is to send and receive digital data using the signal sending and reception properties of the touch-sensitive tablet. The dongle is arranged on the capacitive touch-sensitive surface in operational use.

In general, the capacitive dongle includes:
means for sending periodic analogue signals, said signals being sent at at least one specific frequency known as the dongle frequency compatible with the frequencies of the touch-sensitive tablet;
a ring-shaped flat conductive metal part connected to said sending means, said part intended to be placed on said capacitive touch-sensitive surface and ensuring the transmission and reception of the data;
means for receiving the received signals output by said conductive metal part;
means for analyzing said digitized received signals;
means for storing the sent signals and the analyzed signals;
a digital communication interface.

Figure 2:
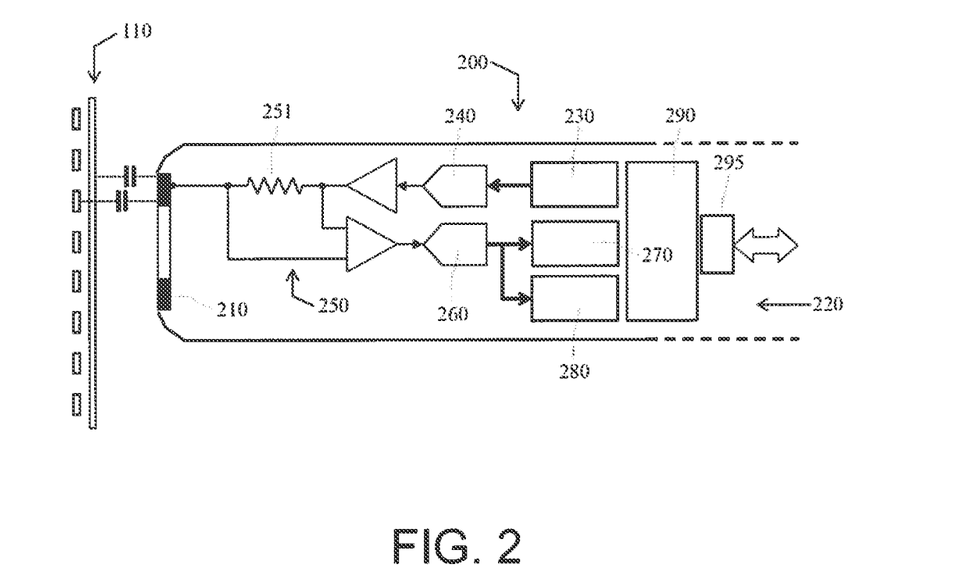
FIG. 2 represents the block diagram of a dongle according to the invention.

By way of example, a capacitive dongle 200 according to the invention is represented in FIG. 2. It includes a capacitive ring 210 and an integrated electronic assembly 220.

The electronic assembly includes means similar to those of the touch-sensitive tablet. They are:
a voltage generator 230;
a DAC 240;
an analogue transmission-reception sub-assembly 250 capable of generating and receiving sinusoidal voltages on the conductive ring 210. In the diagram in FIG. 2, in receive mode, the capacitive current output by the generator of the touch-sensitive surface is measured by a resistance 251, the order of magnitude of which is typically of 1 KΩ;

an ADC 260;

synchronous demodulator circuits 270;

an envelope detector 280 making it possible to detect the presence of electrical signals output by a touch-sensitive tablet, independently of their frequencies;

means 290 for digital processing of the signals output by the synchronous demodulators, making it possible to determine the variations in capacitance induced in the rows and columns of the matrix. Each demodulator makes it possible to deliver the amplitude and the phase of the processed signal;

an input-output interface 295.

The reference electric potential of the analogue circuits 250 or "ground" is linked to an outer conductive part in contact with the hand of the operator to obtain the indispensable common mode feedback by way of the "earth". The supply of electrical power to the dongle can be achieved by a battery or an accumulator, or else by a connection cord if the latter is connected to a laptop computer or an electronic tablet. This power supply is not represented in FIG. 2.

The dongle can be autonomous for the exchange of data with the touch-sensitive screen or be used as a simple interface by being connected either by a cable, or else by a wireless connection of Bluetooth® type, a brand of the Bluetooth Special Interest Group connecting the dongle to a tablet or a laptop computer.

The dongle can possess different keys or buttons to carry out various operations such as powering up.

Figure 3:
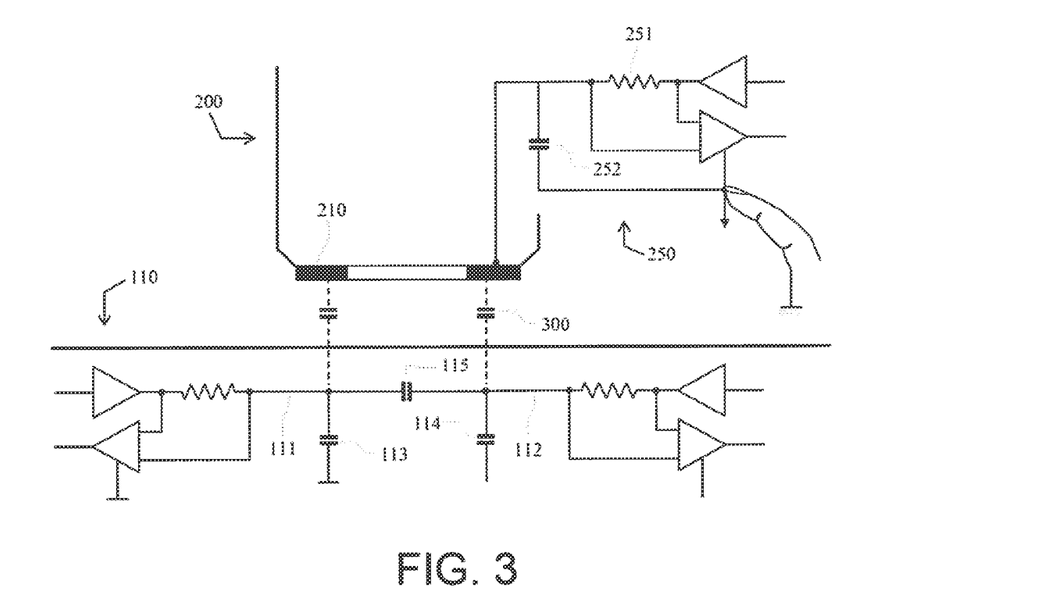
FIG. 3 represents the capacitive coupling between a touch-sensitive tablet and a dongle according to the invention.

FIG. 3 represents the various capacitances existing at the surfaces in contact between the dongle and the rows and columns of the touch-sensitive surface. Each row 111 has a capacitance 113, each column 112 has a capacitance 114. Each row and column intersection has a mutual capacitance 115. The coupling between the dongle and the touch-sensitive surface has a capacitance 300. The mechanical design of the dongle takes into account the presence of the metal mass near the conductive ring in such a way that the set of variations in capacitance seen by the touch-sensitive surface is not too perturbed by conductive parts close to the ring. The connection inductance between this ring and the electronics of the dongle in contact with the hand of the operator must not be too high. The value of the equivalent capacitance 252 of the dongle can be relatively high, i.e. of the same order of the total row capacitance 112 or of the column capacitance 113.

When the dongle is applied to the visualization screen, the electronics of the touch-sensitive surface detect a variation in capacitance on the rows and columns situated under the metal ring of the dongle. This set of variations is representative of the geometrical shape of the conductive surface of the dongle. This shape must be chosen in such a way that the set of the capacitance variations is noticeable and easy to discern by comparison with the finger taps of the operator during the normal use of the touch-sensitive surface. To facilitate recognition, it is preferable that the capacitive dongle be placed at any place on the screen and without any particular orientation. Also, the contact part of the dongle is ring-shaped, thus rendering the orientation of the dongle irrelevant.

Figure 4:
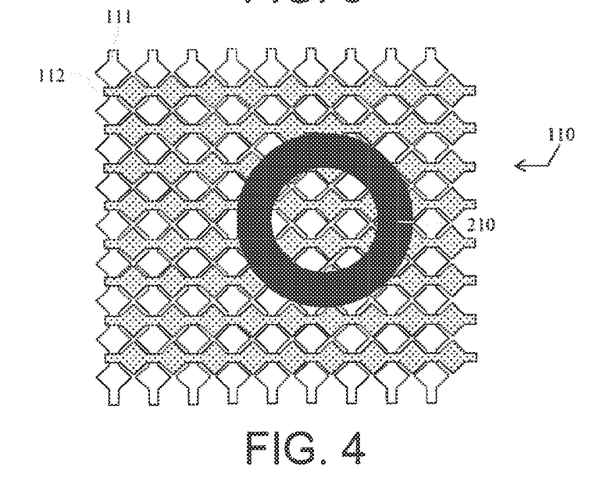
FIG. 4 represents a top view of the detection ring of the dongle placed on a touch-sensitive tablet.

FIG. 4 represents some of the rows 112 of the touch-sensitive surface 110 in dotted lines and some of the columns 111 of the touch-sensitive surface 110 in white. The rows and columns of the touch-sensitive tablet in FIG. 4 have a so-called "diamond" structure. The conductive surface 210 of the ring-shaped dongle is represented in black in this FIG. 4. The difference between the two radii of the ring must be substantially equal to one pitch of the matrix of the touch-sensitive tablet. The term pitch is understood to mean the distance separating two consecutive rows or columns. The outer diameter must be large enough that the capacitive effect can be distinguished from any mark while remaining of a reasonable size, so that the ring remains of acceptable dimensions. A good compromise is for the inner ring to have a radius equal to around two pitches and the outer ring to have a radius equal to 3 pitches, i.e. for a pitch of 7 millimetres, an outer radius of the dongle ring of around 20 millimetres.

Figure 5:
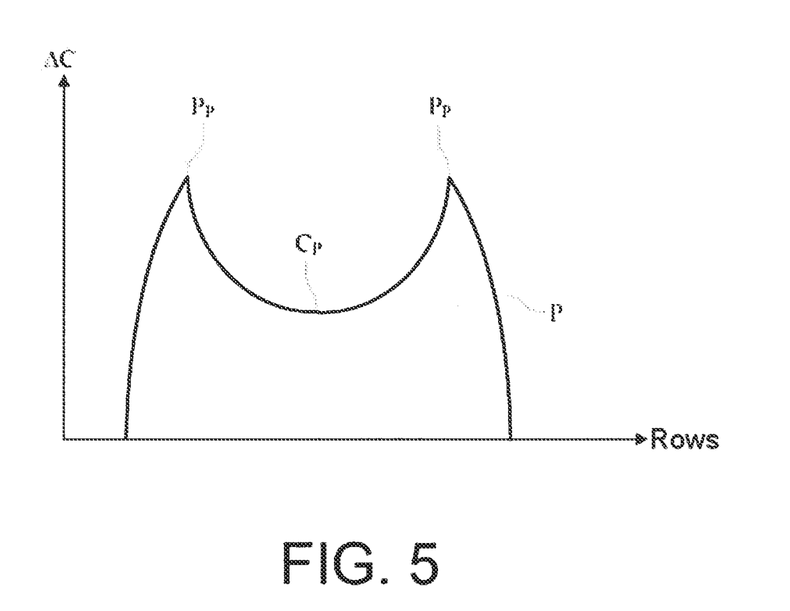
FIG. 5 represents the capacitive profile of the dongle perceived by the touch-sensitive tablet.

The variations in capacitance ΔC detected on the rows of the touch-sensitive surface caused by the placement of the dongle are represented in a theoretical manner in FIG. 5. A profile P is obtained including two peaks $P_P$ spaced apart by the inner diameter of the ring surrounding a central trough $C_P$. This profile is identical over the columns of the matrix. Of course, this profile varies slightly as a function of the effective position of the dongle on the touch-sensitive surface.

Figure 6:
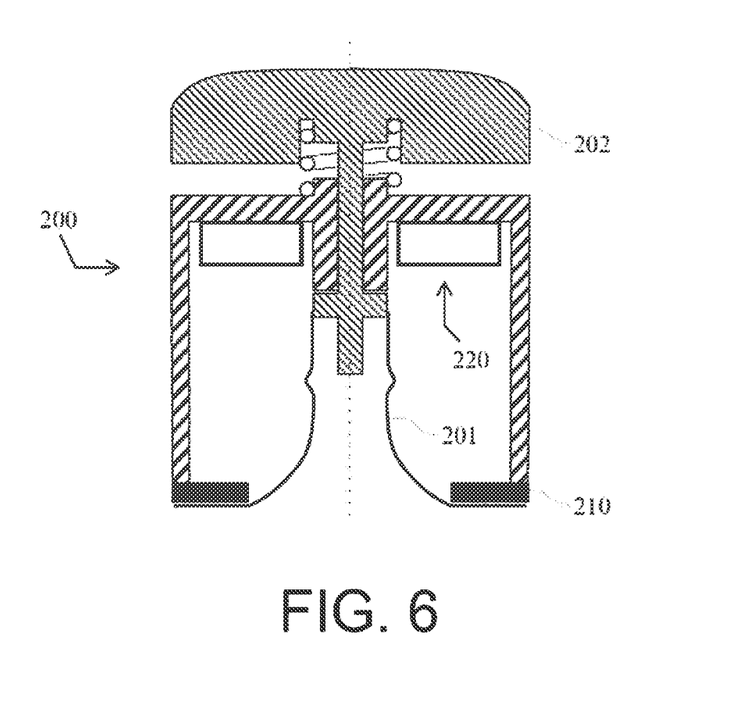
FIG. 6 represents a section view of a dongle with a suction cup.

For the transmission of files of large size either in sending mode or receiving mode, the transmission period can be relatively long. However, the visualization screen is generally vertical or close to vertical. In this case, it is possible to equip the dongle with a suction cup that makes it possible to fasten the dongle to the touch-sensitive tablet. Thus, the user does not have the hold the dongle during the transmission period. This solution is illustrated in FIG. 6 which represents a section view of the dongle 200. The latter includes a suction cup 201 actuated by a spring piston 202. Furthermore, with this suction cup holding the dongle in the same position it is no longer necessary to detect and track the position of the dongle constantly. In this case the amplitude information can be used for transmission, which increases the number of transmitted bits per symbol and improves the transmission bitrate.

The method of communication between a capacitive dongle according to the invention and a visualization device comprising a touch-sensitive surface includes the following steps:

Step 1: Recognition, by the recognizing means of the touch-sensitive surface, of the determined profile of the ring-shaped flat conductive metal part of the dongle;

Step 2: Recognition by the detecting means, known as "envelope detection", of the dongle, of the signals sent by the touch-sensitive surface in operation;

Step 3: Preparation of the dongle operating mode of the touch-sensitive surface, the sending means switch to the mode for sending the dongle frequencies and the receiving means of the touch-sensitive surface switch to the mode for receiving the dongle frequencies;

Step 4: Operation in dongle mode, the touch-sensitive surface and the dongle exchange signals at the dongle frequencies.

In step 1, the touch-sensitive surface is in a normal operational tap detection mode. The recognition of the capacitive dongle is achieved solely by the recognition of the shape of the capacitive ring of the dongle. During this phase, the dongle is in a stand-by position, initialized on being powered up. It does not generate any signal and its synchronous demodulators are not active. Its envelope detection function remains in sleep mode, however. It makes it possible to detect the contact with the touch-sensitive surface by the detection of the amplitude of signals within the concerned frequency range, which the synchronous demodulators cannot do since they do not know the exact value of the frequencies in question.

Indeed, the various screens of one and the same instrument panel work with different frequencies in order that the touch-sensitive surfaces do not interfere with each other. The dongle therefore a priori ignores the frequencies used by the touch-sensitive tablet on which it rests.

The touch-sensitive surface detects the profile of the row and column self-capacitance variation. This profile is of the type shown in FIG. 5. The detection can be achieved simply by detecting the two maxima of the profile, their relative distance being known, or the ratio of the maximum amplitude of the peaks to that of the central trough. More sophisticated recognition means can be used. When this first step is finished, the position coordinates of the dongle are known. In a variant, the system can display a specific symbol representing the "footprint" of the dongle and prompt the operator to place the dongle on top of it. Thus, the position of the dongle is fully known.

In parallel, in a second step, the envelope detector of the dongle detects the presence of signals of acceptable amplitude within the suitable range of frequencies making it possible to detect the presence of an active touch-sensitive tablet. The dongle activates its synchronous demodulators and is in standby to receive a message from the touch-sensitive tablet.

In a third step, the touch-sensitive surface switches to a dongle operating mode. The touch-sensitive surface configures the carrier frequencies of its generators on specific dongle frequencies, known to the latter and the visualization screens. It is preferable to choose dongle frequencies that are not used for tap detection. In the example in FIG. 1, the touch-sensitive surface operates with four frequency generators, four particular frequencies are dedicated to the dongle in order to optimize the use of available hardware resources. These frequencies are known to the dongle by design.

The tablet then sends a first message of recognition to the dongle. The dongle, which was in standby mode and had detected the potential contact with a touch-sensitive surface, will detect the message sent by the touch-sensitive surface and after the end of the message will await the expiration of a certain amount of time.

In a fourth step, the transmission of the data is carried out. The dongle has indeed received the initialization message sent by the touch-sensitive surface and has waited for the amount of time elapsed after the end thereof.

The dongle then enters a "master" mode, for half duplex transmission. In this mode, the dongle and the touch-sensitive surface alternately send and receive on the same specific dongle frequencies. When the amount of time has expired, the touch-sensitive surface has also entered a "slave" mode while it awaits a communication directed by the dongle.

The half duplex mode is favoured to the extent that it is the most appropriate for the transmission needs under consideration and makes the best use of the available hardware resources. But a so-called full duplex mode of communication is perfectly achievable. In this mode, the dongle and the touch-sensitive surface simultaneously send and receive on different specific dongle frequencies. In this case, a frequency or frequencies can be allocated to one direction of communication and the rest to the other direction. The touch-sensitive tablet being composed of rows and columns, it is also possible to dedicate the rows and the corresponding sending means to the sending mode and the columns and the corresponding receiving means to the receiving mode.

Of course, if the dongle has not received the message and replied within a given amount of time, the touch-sensitive surface periodically re-launches a new initialization message as long as the presence of a dongle is still unambiguously detected.

Placed in master mode, the dongle conveys to the touch-sensitive surface a successful acquisition message indicating that communication is established and that the dongle is handling it.

By way of example, the communication protocol is similar to that of a conventional half duplex transmission, such as the protocols habitually transmitted on RS-232 or RS-485 media.

During this phase in dongle mode, for half duplex communication, the electronics of the touch-sensitive surface constantly scan an area corresponding to the surface covered by the dongle. When the touch-sensitive surface sends, it measures the capacitance read on the rows and columns thus covered. When the dongle sends, it acts in a similar manner by measuring the received signal.

The evolution of the capacitance and received signal profile makes it possible to detect any variation in the current coordinate of the dongle. Thus the presence of the dongle is constantly confirmed, and its exact coordinate constantly refreshed. This makes it possible to constantly track the variations in the position of the dongle, which offers the operator good flexibility of use, the latter being able to move about a bit. As only the minimum surface corresponding to the dongle is scanned, the time allocated to the communication of data is optimized.

Indeed, for a simplified hardware embodiment, it may be enough to systematically scan the whole touch-sensitive surface. But, when measuring rows and columns far from the dongle, the transmitted signal could turn out to be too weak to establish a successful communication. During these moments, the data would not be transmitted and the average useful bitrate would then be reduced.

The transmission of the data is carried out on several sinusoidal carrier waves. It is preferable for the frequency of these carriers to remain at the lower end of the frequencies normally used for tap detection because of the weakening caused by the linear resistance of the conductive rows and columns of the touch-sensitive surface. The maximum possible frequency depends on the characteristics of the touch-sensitive surface and its dimensions. Typically, this maximum frequency has a value of a few hundred kilohertz.

The period of a transmitted symbol is slightly above the integration time of synchronous detection, the inverse of which corresponds to the spacing of the orthogonal frequencies. For a time period of 50 μs, the obtained bitrate per symbol is of 20 kHz.

The peak transmission bitrate corresponds to the product of the bitrate per symbol, multiplied by the number of bits per symbol, multiplied by the number of carriers, A transmission of OFDM (Orthogonal Frequency Division Multiplexing) type allows a relatively high bitrate, thanks to the large number of carriers used and the large number of bits encoded per symbol.

In the case where the system possesses means for generating and demodulating four carrier frequencies, a modulation of QPSK (QuadriPhase Shift Key) or DQPSK (Differential QuadriPhase Shift Key) type provides two bits per symbol. The peak bitrate then has a value of 160 Kbaud, a sufficient bitrate for a transmission corresponding to the RS-232 or ARINC-429 standards. To double the bitrate, the use of twice as many phase values as QPSK modulation can also be envisaged.

Modulation of the phase only offers the advantages of simplicity of encoding during transmission and the reserving of the amplitude information for tracking the movement of the dongle on the screen.

In the case where the dongle is paced in a determined place on the screen, the symbol encoding can use the amplitude. Preferably, a screen site is chosen at which the attenuation of the signal due to the resistive nature of the rows and columns is lowest.

What is claimed is:

1. A capacitive dongle intended to be used with a visualization device including a capacitive touch-sensitive surface comprising a matrix of conductive rows and columns, the capacitive dongle being arranged on the capacitive touch-sensitive surface in an operational use, the capacitive dongle operating in a send mode and in a receive mode, the capacitive dongle comprising:
   a voltage generator coupled to a digital-to-analog converter (DAC) that are used to send periodic analog signals, the periodic analog signals are sent with at least one specific frequency, wherein the specific frequency is a dongle frequency;
   a ring-shaped flat conductive metal part connected to the DAC that is coupled to the voltage generator, the ring-shaped flat conductive metal part is placed on the capacitive touch-sensitive surface, wherein variations in capacitance are detected on the conductive rows of the capacitive touch-sensitive surface that are caused by the placement of the capacitive dongle having a symmetrical profile that includes two peaks spaced apart by an inner diameter of the ring surrounding a central trough, wherein the symmetrical profile is identical over the conductive columns of the capacitive touch-sensitive surface;
   an analog transmission-reception sub-assembly coupled to an analog-to-digital converter (ADC) that is used to receive a received signals output of the ring-shaped flat conductive metal part;
   a synchronous demodulator circuit and an envelope detector that are coupled to a digital processor used to analyze digitized received signals from the received signals output;
   a storage device to store the sent periodic analog signals and the analyzed digitized received signals; and
   a digital communication interface.

2. The capacitive dongle according to claim 1, wherein
   "the envelope" detector detects signals sent by the capacitive touch-sensitive surface within a range of determined amplitudes and frequencies so as to detect the presence of the capacitive touch-sensitive surface, the envelope detector operating in passive mode, wherein the passive mode operates without transmission of signals by the voltage generator coupled to the digital-to-analog converter (DAC); and
   wherein the synchronous demodulator circuit operates at the dongle frequency or frequencies so as to communicate in the receiving mode with the capacitive touch-sensitive surface.

3. The capacitive dongle according to claim 1, wherein the thickness of the ring-shaped flat conductive metal part is substantially equal to one pitch of the matrix of conductive row and columns of the capacitive touch-sensitive surface.

4. The capacitive dongle according to claim 1, wherein the capacitive dongle includes a suction cup device that holds the capacitive dongle in place on the capacitive touch-sensitive surface.

5. A visualization device including a capacitive touch-sensitive surface that exchanges data with a capacitive dongle, the capacitive dongle being arranged on the capacitive touch-sensitive surface in an operational use, the capacitive dongle operating in a send mode and in a receive mode, the capacitive dongle comprising:
   a voltage generator coupled to a digital-to-analog converter (DAC) that are used to send periodic analog signals, the periodic analog signals are sent with at least one specific frequency, wherein the specific frequency is a dongle frequency;
   a ring-shaped flat conductive metal part connected to the DAC that is coupled to the voltage generator, the ring-shaped flat conductive metal part is placed on the capacitive touch-sensitive surface;
   an analog transmission-reception sub-assembly coupled to an analog-to-digital converter (ADC) that is used to receive a received signals output of the ring-shaped flat conductive metal part;
   a synchronous demodulator circuit and an envelope detector that are coupled to a digital processor used to analyze digitized received signals from the received signals output;
   for a storage device to store the sent periodic analog signals and the analyzed digitized received signals;
   a digital communication interface; and
   the capacitive touch-sensitive surface including a matrix of conductive rows and columns, wherein the capacitive touch-sensitive surface recognizes
      a determined profile corresponding to variations in capacitance induced on the matrix of conductive rows and columns by the ring-shaped flat conductive metal part, when the capacitive dongle is placed on the capacitive touch-sensitive surface, wherein the variations in capacitance are detected on the conductive rows of the capacitive touch-sensitive surface that are caused by the placement of the capacitive dongle having a symmetrical profile that includes two peaks spaced apart by an inner diameter of the ring surrounding a central trough, wherein the symmetrical profile is identical over the conductive columns of the capacitive touch-sensitive surface, and
      the capacitive touch-sensitive surface
      sends and receives at the specific dongle frequency.

6. The visualization device according to claim 5, further comprising a screen that includes a specific place marked by a particular symbol reserved for a site of the capacitive dongle.

7. A method of communication between a capacitive dongle and a visualization device, wherein the visualization device includes a capacitive touch-sensitive surface that exchanges data with the capacitive dongle, the capacitive dongle being arranged on the capacitive touch-sensitive surface in an operational use, the capacitive dongle operating in a send mode and in a receive mode, the method comprising:
   sending periodic analog signals with a voltage generator coupled to a digital-to-analog converter (DAC), the periodic analog signals sending at least one specific frequency, wherein the specific frequency is a dongle frequency;
   placing a ring-shaped flat conductive metal part on the capacitive touch-sensitive surface, the ring-shaped flat conductive metal part connected to the DAC that is coupled to the voltage generator, wherein variations in capacitance are detected on the conductive rows of the capacitive touch-sensitive surface that are caused by the placement of the capacitive dongle having a symmetrical profile that includes two peaks spaced apart by an inner diameter of the ring surrounding a central trough, wherein the symmetrical profile is identical over the conductive columns of the capacitive touch-sensitive surface;

receiving a received signals output of the ring-shaped conductive metal part with an analog transmission-reception sub-assembly coupled to an analog-to-digital converter (ADC);

analyzing digitized received signals from the received signals output with a synchronous demodulator circuit and an envelope detector that are coupled to a digital processor;

storing the sent periodic analog signals and the analyzed digitized received signals with a storage device; and providing a digital communication interface.

8. The method according to claim 7, when the capacitive dongle is placed on the capacitive touch-sensitive surface, further comprising:

recognizing, by the touch-sensitive surface, a determined profile of the ring-shaped flat conductive metal part of the dongle;

recognizing, by the envelope detector, signals sent by the capacitive touch-sensitive surface in operation;

preparing the capacitive dongle in an operating mode of the capacitive touch-sensitive surface, wherein the operating mode includes at least one of the send mode and the receive mode, wherein at least switching to one of the send mode for sending the dongle frequencies and the receive mode for receiving the dongle frequencies; and operating in a dongle mode when the capacitive touch-sensitive surface and the capacitive dongle exchange signals at the dongle frequencies.

9. The method according to claim 7, wherein operating in the dongle mode is performed in full duplex mode, the dongle and the touch-sensitive surface simultaneously sending and receiving on different specific dongle frequencies, and wherein operating in the dongle mode is performed in half duplex mode, the dongle and the touch-sensitive surface alternately sending and receiving on the same specific dongle frequencies.

10. The method according to claim 7, wherein, when operating in the dongle mode, the touch-sensitive surface scan only the conductive rows and columns of the matrix arranged under the ring-shaped flat conductive metal part of the capacitive dongle.

11. The method according to claim 7, wherein the capacitive touch-sensitive surface includes a matrix of conductive rows and columns, the capacitive touch-sensitive surface further comprising:

recognizing a determined profile corresponding to the variations in capacitance induced on the matrix of conductive rows and columns by the ring-shaped flat conductive metal part when the capacitive dongle is placed on the capacitive touch-sensitive surface; and sending and receiving at the specific dongle frequency.

\* \* \* \* \*